UNITED STATES PATENT OFFICE.

JOHN E. BUCHER, OF COVENTRY, RHODE ISLAND.

PROCESS OF PRODUCING FORMATES AND THE LIKE.

1,083,589. Specification of Letters Patent. Patented Jan. 6, 1914.

No Drawing. Application filed March 10, 1913. Serial No. 753,360.

*To all whom it may concern:*

Be it known that I, JOHN E. BUCHER, of Coventry, in the county of Kent and State of Rhode Island, have invented certain new and useful Improvements in the Process of Producing Formates and the like, of which the following is a specification.

This invention relates to an improved process for the production of certain hydrogen compounds such as ammonia and compounds containing the constituents of the radical carboxyl, *e. g.* formates from a cyanogen compound such as an alkali metal cyanid. In its preferred form the said process involves the hydrolysis of cyanids into ammonia and formates in solutions containing a substance or substances which is or are, as the case may be, very soluble at the temperature of the operation, *e. g.* alkali hydroxids, barium hydroxid, alkali formates, etc.

It is known that when steam is passed over cyanids, such as those of sodium or potassium, at temperatures which are in the neighborhood of, for example, 500° C., or above, ammonia is formed according to the equation—

(1) $2NaCN + 4H_2O =$
$Na_2CO_3 + 2NH_3 + CO + H_2$.

If the cyanid is present, admixed with carbon, iron, etc., as in the case where it is produced by passing nitrogen over a heated mixture of carbon, sodium carbonate and finely divided iron, as described in my pending application, Serial Number 726,924, filed November 22, 1912, other reactions may also take place under the prescribed conditions, *e. g.*—

(2) $3Fe + 4H_2O = Fe_3O_4 + 4H_2$.
(3) $C + H_2O = CO + H_2$.

That is, further decomposition may take place at the expense of the carbon or the iron (or like material) with the consequent formation of such products as hydrogen, carbon monoxid, and even carbon dioxid and possibly oxids of iron. Also, if the temperature be too high, the ammonia may dissociate into nitrogen and hydrogen, thus causing serious loss. If the operation be conducted at lower temperatures, these disadvantages become less marked but the action may now become too slow for the best commercial results. Now, at relatively low temperatures, such as between 150° and 300° C., I have observed that when steam is passed over the cyanid or a cyanid-containing mass or mixture, the reaction is slow but that at such temperatures the residue contains more or less alkali formate. Hence, I infer that the reaction must have proceeded in part, at least, according to the equation:

(4) $NaCN + 2H_2O = HCO_2NA + NH_3$.

The problem, therefore, arises how to most advantageously and efficiently effect this reaction so as to obtain the ammonia substantially pure and the yield of formate in favorable condition.

I am aware that it has been proposed to hydrolyze cyanids of the alkali or alkaline earth metals, by adding water and then heating under pressure, in an autoclave. The use of autoclaves, however, involves some disadvantages and they are furthermore somewhat expensive. If one hydrolyzes sodium cyanid by simply boiling it directly with water, there is some loss of cyanogen because of hydrolytic dissociation, according to the equation:

(5) $NaCN + HOH \rightleftharpoons NaOH + HCN$.

Also, the initial temperature cannot, when using a solution of cyanid under normal conditions, materially exceed about 126° C., which is the boiling-point of a saturated solution of sodium or potassium cyanid. After such temperature has been reached, however, there occurs a steady, but slow, evolution of ammonia, accompanied by some rise in temperature as the water is used up in the reaction. (See equation 4). I have found that by adding a suitable quantity of a material, such, for example, as caustic soda, to said solution of sodium cyanid, the boiling-point thereof can be raised very considerably, and under the conditions set forth, ammonia gas is given off rapidly so that in a very few hours the hydrolysis is nearly completed; 96% or more of the sodium cyanid having been transformed into sodium formate and ammonia according to equation 4. If the temperature has not been carried too high, the resulting solution gives no tests for carbonates or oxalates, and the ammonia gas may be obtained chemically pure with the exception of a small quantity of water vapor, care being of course exercised to avoid carrying off portions of the reacting liquid in the form of spray in the rapid current of ammonia gas given off; a column still, Hempel column or a scrubber providing means to this end. By properly regulating the condenser, however, enough water can be allowed to pass over together with the ammonia, so that the mixture will condense directly to the 28 to 30% commercial ammonia of specific gravity .90; or it can be made of weaker strength, if desired. When ammoniacal solutions are not required. the ammonia gas obtained can readily be dried; the process being well adapted for the preparation of anhydrous or liquid ammonia. When the decomposition of the cyanid is sufficiently complete, the solution may be cooled and pure sodium formate will crystallize out nicely in the form of glistening white crystals. These latter may be removed by filtration, centrifugal machines or by other suitable means.

Sodium formate is very soluble in pure water, but the preferred material used to elevate the boiling-point of the initial solution, i. e. caustic soda, depresses the solubility of said formate very greatly, so that it is, at such time, only moderately soluble in the alkaline-liquor and consequently may be very easily separated by crystallization, in manner aforesaid. A second advantage is hence obtained by the use of caustic soda or some like material in the process. A new portion of the sodium cyanid may now be added to the mother-liquor, with the addition of water also, if the latter be necessary, and the hydrolysis conducted as before. It will be noted that a given quantity of the caustic soda or like acting material may be used over and over again to produce ammonia and sodium formate by repeated removal of the formate accompanied by subsequent addition of new portions of water and sodium cyanid.

In general, I may state that when working with alkali cyanids I prefer to use the corresponding caustic alkali rather than any other substance or substances, as it introduces no new acid or basic parts. Further, it prevents hydrolytic dissociation, facilitates or causes the rapid formation of ammonia, in large part, at least, by raising the boiling-point of the solution, and, in the case of sodium cyanid, the resulting sodium formate can be made, by the addition of a proper quantity of the solubility-depressing agent or material, to the reactive mass, at least five times less soluble than it would be in water.

Certain materials may be used in lieu of the alkali caustic given by way of example without departing from the spirit of my invention and it further is to be observed that some of said substitute materials may not possess all of the advantages possessed by said caustic. Thus, when using a potassium compound, potassium formate may be used to raise the temperature of the gas evolving operation, in manner aforesaid, but the formate will not hold back the volatile cyanogen compounds, which may be formed, from passing off with the ammonia, which the caustic alkali is capable of doing. In this case caustic potash may be incorporated in the liquid mass in addition to formate of potash. The addition of formate to the solution when sodium compounds alone are used is of doubtful value in so far as the elevation of the boiling point of the formate forming operation is concerned.

I am aware that many changes, modifications, and substitutions of materials for those herein specified as the preferred materials, may be made in the process itself without departing from the spirit of my invention and I hence desire to be limited only by the claims appended hereto.

To more fully exemplify my process, let it be assumed that a suitable receptacle or flask has been partly filled with a mixture of one part of sodium cyanid, one part of water and one of sodium hydroxid. The temperature of the mixture is then raised until boiling commences at about 150° C., and this operation is continued vigorously. The temperature of the solution gradually rises until, if fresh water be not added to replace that used up, a temperature considerably in excess of 200° C. may be reached in the course of, say, two hours or even less. At about 218° C., if the temperature be permitted to ascend to this point, frothing commences, which becomes increasingly troublesome. I have observed also that decomposition of the formate is distinctly noticeable at as low as 195° C. and increases rapidly with the temperature.

Ammonia is, of course, evolved freely when boiling commences, being produced at the rate of about 40 grams, per hour, per pound of cyanid present in the flask, and as the temperature rises to about the higher temperature aforesaid, the yield of this gas may rise to 100 grams per hour, and this notwithstanding the fact that but about one third of the cyanid initially present may remain.

The ammonia may be delivered to a second receptacle, containing water, and may be readily and completely absorbed by said water until the temperature of the boiling mass in the flask reaches about 200° C., after which absorption is no longer quite so complete and at 220° C. a permanent gas, i. e. hydrogen, will bubble rapidly through the water. I may here note that this gas forms in appreciable quantities at a temperature as low as 190° C., and that it of course is evidence of a loss of the caustic alkali said loss being approximately ½ of one per cent. at this latter temperature. If, therefore, sodium formate is to be economically obtained from the reaction mass under the prescribed conditions, the temperature of the latter should be held not greatly above 200° C., and preferably somewhat below 200° C. by the addition of water. Further, when the temperature is not too high, and conditions are otherwise suitable, practically no frothing of the alkaline liquor will occur and the receptacle in which this liquor is boiled may be well filled, thus economizing space.

The above results show that a large output of ammonia may be obtained, by means of my process, from a comparatively small and very simple plant or apparatus.

I particularly desire to emphasize the three-fold function of the preferred material, caustic alkali, incorporated in the cyanid solution, namely: its property of preventing hydrolytic dissociation and consequent waste of cyanogen and contamination of the ammonia with cyanogen products; its ability to elevate the boiling-point of the solution; and its solubility-depressing action upon the product of the reaction remaining in the liquid mass, or in other words its tendency to cause the formate when that is the said product, to crystallize or be salted out of said liquid mass. In working the process with alkaline earth or other cyanids suitable changes in the procedure, such as those previously indicated, will obviously readily suggest themselves to those skilled in the art.

In the claims the term "light metal" is to be considered sufficiently comprehensive to include those alkali metals and alkaline earth metals which are capable of participation in the formate-forming or corresponding reaction. Finally, it should be noted that the incorporation of the caustic alkali or like material in the reactive mass may be effected chemically as well as physically. Thus, when producing cyanid by means of the process described in my pending application, above referred to, if the said process be not so conducted as to completely convert sodium carbonate, for example, into sodium cyanid, or in other words, so that the resultant product of said process is a mixture of cyanid and carbonate, obtained, let us say, by lixiviating the reactive mass in which is present the catalytic material used in said process, it is possible to produce from this mixture a part at least of the caustic soda used subsequently in the herein described process, while at the same time getting rid of an objectionable impurity in the cyanid. To this end the solution resulting from said lixiviation may be agitated with milk of lime, for example, which causticizes the unchanged sodium carbonate, yielding the preferred material for preventing hydrolytic dissociation, in the present operation, directly incorporated in the cyanid solution. This permits of my said former process being operated at such moderate temperatures as to afford an 85 or 90% yield of cyanid, in a short time, the residual carbonate being then not only easily removed in the manner just indicated, but actually furnishing a substance of particular value in the conversion of the cyanid to formate.

Having thus described my invention, what I claim is:

1. The process of treating a cyanogen compound of a light metal to produce a carboxyl derivative of said compound, said process comprising effecting hydrolysis of said compound while the latter is in the presence of another compound of the same light metal, which other compound is capable both of raising the boiling-point of the reactive mass and of substantially preventing hydrolytic dissociation of said cyanogen compound.

2. The process of treating a cyanogen compound of a light metal to produce a carboxyl derivative of said compound, said process comprising hydrolyzing said compound while the latter is in the presence of an oxy compound of the same light metal, which is capable of raising the boiling-point of the reactive mass, whereby the temperature may be made sufficiently high to permit of a hydrolytic action such as will result in a relatively rapid formation of said second mentioned compound, and conducting the operation, in part at least, at such temperature.

3. The process of treating a cyanogen compound of a light metal to produce a carboxyl derivative of said compound, said process comprising hydrolyzing said compound while the latter is in the presence of an oxy compound of a light metal which is capable of raising the boiling-point of the reactive mass, whereby the temperature may be made sufficiently high to permit of a hydrolytic action such as will result in a relatively rapid formation of said second mentioned compound, and conducting the operation, in part at least, at such temperature.

4. The process of treating a cyanogen compound of a light metal to produce a carboxyl derivative of said compound, said process comprising vigorously hydrolyzing said compound while the latter is in the presence of an hydroxid of said light metal, said hydroxid being substantially unchanged during the course of the operation.

5. The process of treating a cyanogen compound of a light metal to produce a formate, said process comprising vigorously hydrolyzing said compound while the latter is in the presence of an oxy compound of a light metal, to convert said cyanogen compound to said formate, said oxy compound being substantially unchanged during the course of the operation.

6. The process of treating an alkali cyanid to produce a formate, said process comprising vigorously hydrolyzing said cyanid while the latter is in the presence of a caustic alkali, to convert said cyanid to said formate at a temperature the use of which is rendered possible by the presence of said caustic alkali.

7. The process of treating a cyanogen compound of an alkali metal to produce a carboxyl derivative of said compound, which comprises hydrolyzing a solution of said compound which contains an oxy compound capable of materially depressing the solubility of said carboxyl derivative when the latter is formed, and separating a part at least of said carboxyl derivative in solid form from the resultant mother-liquor.

8. The process of treating an alkali cyanid to produce a formate which comprises hydrolyzing a solution of said cyanid in which is present a caustic alkali which remains substantially unchanged during the course of the operation.

9. The process of treating an alkali cyanid to produce a formate which comprises hydrolyzing a solution of said cyanid in which is present a caustic alkali which remains substantially unchanged during the course of the operation, the hydrolysis being effected at a temperature below 200° C.

10. The process of treating an alkali cyanid to produce an alkali formate which comprises hydrolyzing a solution of said cyanid in which caustic alkali is present in quantity sufficient to materially depress the solubility of the formate formed by said hydrolysis, and separating the crystallized formate from the mother-liquor.

11. The process of treating a cyanogen compound of a light metal to produce a compound of said metal which includes the constituents of the radical carboxyl, said process comprising effecting hydrolysis of said cyanogen compound yielding the said compound containing the constituents of carboxyl, and a gaseous by-product, at a temperature sufficient to permit the rapid evolution of said gaseous by-product, and substantially preventing hydrolytic dissociation of said cyanogen compound by incorporating in the reactive mass material capable of substantially preventing such a hydrolytic dissociation of said compound as would result in the combination of some of the cyanogen thereof with hydrogen, the said material being substantially unaffected by the reaction.

12. The process of treating a cyanogen compound of a light metal to produce a compound of said light metal which includes the constituents of the radical carboxyl, said process comprising hydrolyzing a solution of said cyanogen compound in which is present material capable of raising the boiling-point of said solution and also thereafter of depressing the solubility of the said second mentioned compound in the liquor resulting from said hydrolysis.

13. The process of treating a solution of alkali cyanid in which is present, as an impurity, therein, alkali carbonate, to produce an alkali formate, said process comprising treating said solution with milk of lime to causticize said carbonate, yielding caustic alkali, and then hydrolyzing said solution, containing the so formed alkali, to convert said cyanid to formate while at the same time yielding ammonia.

14. The process of treating a solution of a cyanogen compound of a light metal in which is present, as an impurity, therein, a carbonate of said light metal, to produce a compound of said light metal containing the constituents of the radical carboxyl, said process comprising treating said solution with a reagent capable of causticizing said carbonate, yielding a hydroxid of said light metal, and then hydrolyzing said solution, containing the so formed hydroxid, to convert said cyanogen compound to said compound containing said carboxyl constituents.

15. The process of treating an alkali cyanid to produce a carboxyl containing derivative thereof, which comprises chemically incorporating a caustic alkali in a solution of said cyanid by converting an impurity initially present therein to said caustic alkali, and hydrolyzing said solution to convert said cyanid to said carboxyl containing derivative while leaving substantially unaltered the said caustic alkali, and effecting a separation of said derivative from the residues of said hydrolysis, in part at least, through the solubility-depressing action of said caustic alkali.

In testimony whereof I have affixed my signature, in the presence of two witnesses.

JOHN E. BUCHER.

Witnesses:
 HOWARD C. RIPLEY,
 NORMAN E. HOLT.